United States Patent [19]
Klaue

[11] Patent Number: 4,727,764
[45] Date of Patent: Mar. 1, 1988

[54] AUTOMOTIVE TRANSMISSION SYSTEM

[75] Inventor: Hermann Klaue, Cremlingen-Weddel, Fed. Rep. of Germany

[73] Assignee: J.M. Voith GmbH, Heidenheim, Fed. Rep. of Germany

[21] Appl. No.: 823,490
[22] PCT Filed: May 9, 1985
[86] PCT No.: PCT/EP85/00211
   § 371 Date: Jan. 7, 1986
   § 102(e) Date: Jan. 7, 1986
[87] PCT Pub. No.: WO85/05427
   PCT Pub. Date: Dec. 5, 1985

[30] Foreign Application Priority Data

May 11, 1984 [DE] Fed. Rep. of Germany ....... 3417504

[51] Int. Cl.$^4$ ............................................. F16H 3/08
[52] U.S. Cl. ................................. 74/331; 74/336 R
[58] Field of Search ............ 74/331, 335, 333, 336 R, 74/339, 330, 752 A, 866, 740; 192/3.58

[56] References Cited

U.S. PATENT DOCUMENTS

| | | | |
|---|---|---|---|
| 2,124,192 | 7/1938 | Hanson | 74/330 |
| 2,757,557 | 8/1956 | Hoffman | 74/740 |
| 2,871,726 | 2/1959 | Kamlukin | 74/740 |
| 3,478,851 | 11/1969 | Smyth et al. | 74/866 |
| 3,673,890 | 7/1972 | Crooks | 74/740 X |
| 3,772,933 | 11/1973 | Prenzel et al. | 74/752 A |
| 3,834,499 | 9/1974 | Candellero et al. | 192/3.58 |
| 3,946,842 | 3/1976 | Siebers et al. | 192/358 |
| 4,192,196 | 3/1980 | Bogema et al. | 74/339 |
| 4,200,006 | 4/1980 | Ehrlinger et al. | 74/740 X |
| 4,519,484 | 5/1985 | Nagaoka et al. | 192/3.58 |
| 4,527,447 | 7/1985 | Richards | 74/331 |

FOREIGN PATENT DOCUMENTS

| | | |
|---|---|---|
| 59456 | 2/1971 | Australia . |
| 0025823 | 4/1981 | European Pat. Off. . |
| 3021489 | 12/1981 | Fed. Rep. of Germany . |
| 2117555 | 7/1972 | France . |

Primary Examiner—Leslie Braun
Assistant Examiner—David Novais
Attorney, Agent, or Firm—Jeffers, Hoffman & Niewyk

[57] ABSTRACT

A multiple speed transmission, specifically for motor vehicles, comprises a main shaft 24 and two auxiliary shaft $24_1$ and $24_2$. Arranged on these shafts are several gear wheel groups of which three gear wheels each are constantly in mesh. Arranged on the main shaft 24, for shifting the gears, are sliding sleeves $24_3$, $24_4$, $24_5$, $24_6$ of which one each can be coupled to one of the gear wheels (by use of an operating cylinder) in interlocking fashion. To create synchronism on the sliding sleeve to be engaged, either an accelerating device 33 or a retarding device 36 acts on one of the auxiliary shafts, depending on shifting direction. Contingent upon reaching synchronism on the respective sliding sleeve, a mircoprocessor controls the servoagent supply to the respective operating cylinder.

19 Claims, 6 Drawing Figures

AUTOMOTIVE TRANSMISSION SYSTEM

The invention concerns a multiple speed transmission, specifically for motor vehicles which transmission is broadly a split-speed type transmission with a main power transfer path and at least one auxiliary power transfer path. In transmissions of that type, the transmission of force occurs through form-fitting shifting elements. Absent are frictional shifting elements which are used in other transmissions and cause power losses in the disengaged condition.

To establish synchronism for shifting into another gear, other transmissions of this type feature frictional synchronization devices. With normally two such synchronizing devices needed on each sliding sleeve, these devices require a considerable axial space. Besides, the frictional synchronizing devices have an adverse effect on the efficiency of the transmission because the friction faces rotate constantly in oil.

The invention provides a multiple speed transmission of the split-speed type which is designed with a minimal length and without frictional synchronizing devices. In these split-speed transmissions shifting between gears is accomplished at a high shifting speed to reduce or minimize the interruption of the force transfer. Further, the transmission should be designed to be equipped with either a manual, semi automatic or fully automatic actuating device.

This problem is inventionally solved in that for creating synchronism, as another gear is shifted, an accelerating device and a retarding device are arranged on the auxiliary shaft (and/or on at least one of the auxiliary shafts). Additionally, an electrical control is provided which is capable of determining whether synchronism has been established on the sliding sleeve concerned as gears are shifted, and which controls the feeding of servoagent to the respective actuating cylinder based on the determined synchronism. In other words: A synchronizing device is provided which is common to all gears (including the above accelerating and the retarding device), and which upon disengagement of the previously engaged gear establishes synchronism on the sliding sleeve to be engaged next, by acceleration or retardation. The central synchronizing device is preferably actuated by a control signal emitted by the electrical control.

The inventional synchronizing device and the automatic engagement of each next gear (with the aid of the above electrical control) governed by its actuation makes it possible to achieve a high shifting speed, although no frictional synchronizing devices are provided on the sliding sleeves. Their elimination reduces the overall length of the transmission; or a greater number of gear groups can be provided at unchanged overall length, and the number of gears increased thereby.

Additional overall length can be saved by providing two auxiliary shafts on both sides of the central main shaft. This feature is previously known as such. The two auxiliary shafts being coplanar with the main shaft, the central main shaft need not transmit appreciable bearing forces to the two auxiliary shafts, due to power branching. Additionally, the torque distribution to two auxiliary shafts permits a relatively narrow design of the gear wheels, resulting in the above additional savings of overall transmission length.

Further embodiments of the invention include the following: a brake-actuated planetary gear sets in the accelerating device, an input pilot transmission component with a double shift clutch, which is also a starting clutch which may have a dual disk arrangement; and, a shift lever for a manual transmission which is operable in perpendicular directions for shifting the principal speeds or split speeds.

Figure 1:
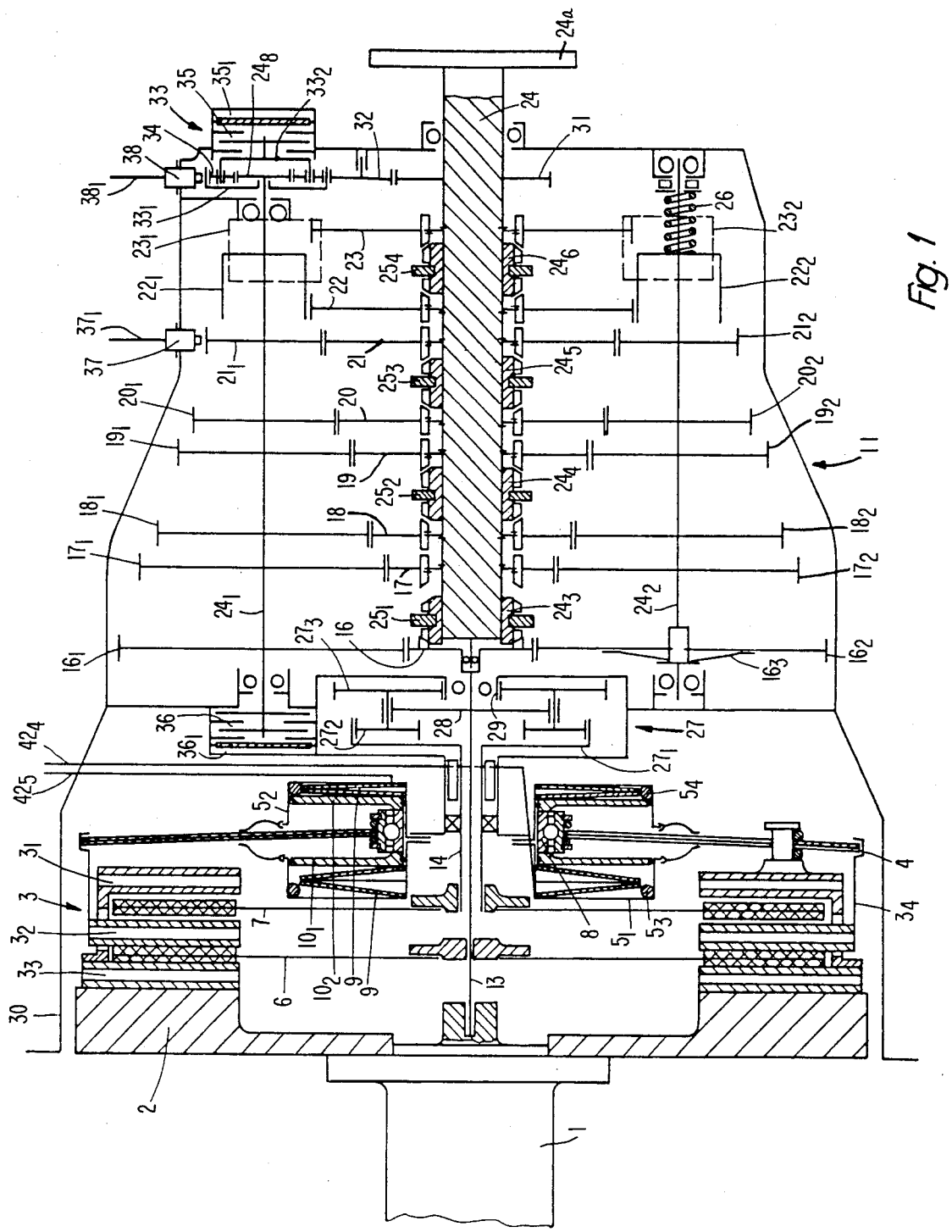
FIG. 1 shows the longitudinal section of the transmission signified 1—1 in FIG. 3.

In the figures, 1 indicates the crankshaft of the engine, 2 the flywheel, and 3 the starting and shifting clutch designed as a double clutch flanged to the flywheel. Moreover, the main multiple speed transmission is marked 11 while a pilot transmission component fashioned as a planetary gear is marked 27. The latter serves to split the gear sets of the main multiple speed transmission 11. The double clutch 3 features three clutch rings $3_1$, $3_2$, and $3_3$ of which only the center ring is axially movable. It connects through extensions $3_4$ with a dual disk spring 4 bearing on bolts $3_5$ so that it causes either the clutch disk 6 or, in opposite direction, the clutch disk 7 to bear. Two pneumatically operable annular pistons $10_1$ and $10_2$ serve the clutch operation in starting and shifting the planetary transmission 27. These pistons are arranged in a two-part annular cylinder housing $5_1$, $5_2$ (connected with the transmission housing 30). Each of the annular pistons $10_1$, $10_2$ bears in the pressure space on prestressed springs 9. Located between the annular pistons is the thrust bearing 8, whose outer race is connected with the disk spring 4. To relieve the thrust bearing in coupled condition, the disk spring 4 is axially entrained by the outer race under play. Also provided for that purpose are the spacer rings $5_3$, $5_4$ serving to seat the annular pistons in the annular cylinder housing. Compressed air is fed to the actuation spaces in the annular cylinder housing through the lines $42_4$ and $42_5$. In the present illustration, the compressed air line $42_4$ is pressurized; overcoming the tension of the springs behind the annular piston $10_2$ and moving it back to its stop on the ring $5_4$, the annular piston $10_1$ has moved the disk spring in a position where the clutch disk 6, due to the torque introduced from the engine, powers the drive gear 16 of the main multiple speed transmission 11 via the drive shaft 13. If compressed air is supplied through the line $42_5$ and the clutch 3 encompasses the clutch disk 7, the planetary transmission 27 is driven through the hollow shaft 14. The latter comprises a drive bell $27_1$, dual planetary gears $27_2$, $27_3$ and a land (planetary support) 28 connecting with the shaft 13.

Figure 2:
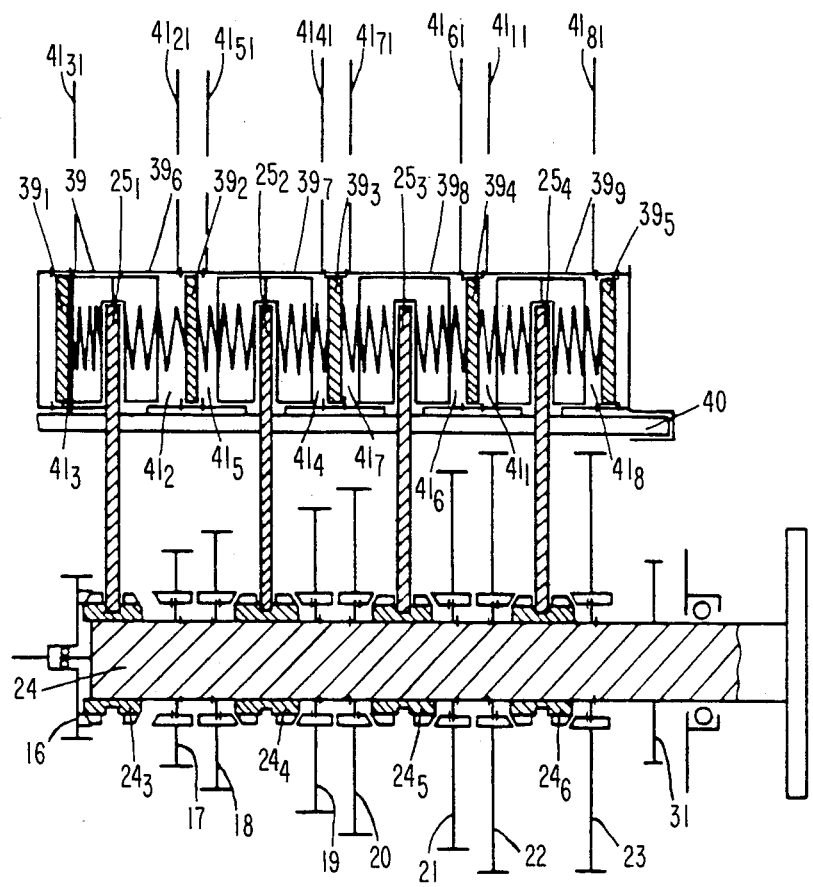
FIG. 2 shows the transmission in a partial longitudinal section of the shift elements, signified 2—2 in FIG. 3.
Figure 3:
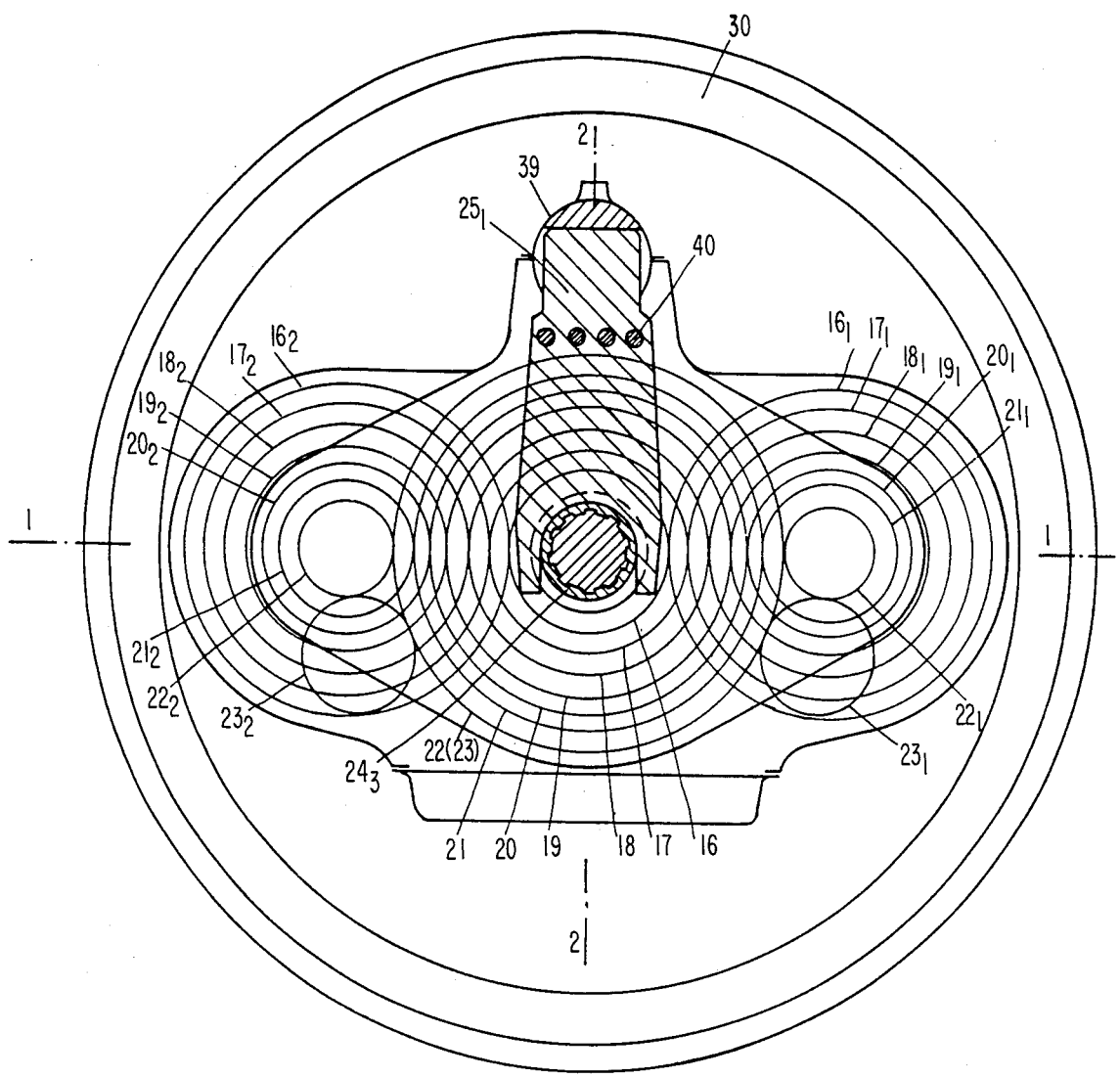
FIG. 3 illustrates the transmission as viewed from the output end, with a section through the selector fork along with the gear plan.

The main multiple speed transmission 11 comprises a main shaft 24 on which seven shift gears 17 through 23 are rotatably mounted. On its end supporting the output flange 24a, the main shaft is mounted in the transmission housing 30 and, on the clutch side, in the drive gear 16. The drive gear 16 drives the two auxiliary shafts $24_1$ and $24_2$ through gears $16_1$ and $16_2$. Mounted rigidly on the two auxiliary shafts, the gears $17_1$ through $23_1$ and/or $17_2$ through $23_2$ form the countergears for the shift gears 17 through 23. Located between the shift gears are the sliding sleeves $24_3$ through $24_6$ which can be moved axially by means of selector forks $25_1$ through $25_4$. The selector forks interlock axially with the double pistons $39_6$ through $39_9$ mounted in the servocylinder housing 39 (FIG. 2). The interior of the cylinder housing 39 is subdivided into four actuating double cylinders with eight pressure spaces $41_1$ through $41_8$, through partitioning walls $39_1$ through $39_5$. The feed lines to the pressure spaces are marked $41_{11}$ through $41_{81}$. To avoid misshifting, each selector fork $25_1$ through $25_4$ connects with one of four rods 40 which in customary fashion permit only the movement of one selector fork, by interlocking.

If the gears of the multiple speed transmission component are helical gears, the drive gears 16, $16_1$ and $16_2$ are designed having a helix angle opposite to that of the shift gears. To obtain a maximally power branching on both auxiliary shafts and compensate for manufacturing tolerances, both the drive gears $16_2$ of the one auxiliary shaft and the auxiliary shaft $24_2$ itself are in this case mounted in axially movable fashion and stressed by springs $16_3$ and 26 against the respective helix angle of the gears.

For synchronization when shifting up, the auxiliary shaft $24_1$ features on its clutch-side end a retarding device in the form of a disk brake 36 which is pneumatically operated. Arranged on the opposite end is an accelerating device in the form of a planetary gear set 33 whose sun gear $33_1$ is driven via the gear 31 arranged on the main transmission shaft 24 and by the gear 32. When shifting down, the central gear $24_8$ of the planetary gear set 33 is accelerated to a higher speed of rotation, for acceleration of the auxiliary shafts, by braking the land (planetary support $33_2$) of the planetary gears 34 by the pneumatically operated brake 35. Coordinated with the input end of the transmission is a rotational speed sensor 37 which is acted upon by the gear $21_1$. Another rotary speed sensor 38 is acted upon by the outer teeth of the sun gear $33_1$ which is driven by the output end. Both sensors 37 and 38 transmit their rotary speed information through electrical lines $37_1$ and $38_1$ to an electrical control (for instance 61, FIG. 4), which will be described farther down and determines the synchronization for shifting. In shifting down, the brake 35 is then operated by compressed air, and the brake 36 in shifting up.

The transmission of the embodiment features the following gear ratio:

| 1. | Gear | 11.15 | 4+ | | 3.05 |
|---|---|---|---|---|---|
| 1+ | | 9.29 | 5. | Gear | 2.53 |
| 2. | Gear | 7.72 | 5+ | | 2.1 |
| 2+ | | 6.41 | 6. | Gear | 1.75 |
| 3. | Gear | 5.32 | 6+ | | 1.45 |
| 3+ | | 4.42 | 7. | Gear | 1.2 |
| 4. | Gear | 3.67 | 7+ | | 1.0 |

The transmission is thus geometrically geared, the jump of the split gear being 1.2. The reverse gears R and R+ can have the same ratios as the 1. and 1+ gear.

Listed hereafter are the force-transmitting gears in the various speeds:

Gear 1/1+ 16, $16_1$, $16_2$, $22_1$, $22_2$, 22
Gear 2/2+ 16, $16_1$, $16_2$, $21_1$, $21_2$, 21
Gear 3/3+ 16, $16_1$, $16_2$, $20_1$, $20_2$, 20
Gear 4/4+ 16, $16_1$, $16_2$, $19_1$, $19_2$, 19
Gear 5/5+ 16, $16_1$, $16_2$, $18_1$, $18_2$, 18
Gear 6/6+ 16, $16_1$, $16_2$, $17_1$, $17_2$, 17
Gear 7/7+ direct from shaft 13 to shaft 24

In gears 1 through 7 and R, the planetary gear set 27 is engaged (flow of force through the clutch disk 7). In gears 1+ through 7+ and R+, the planetary gear set 27 is circumvented (flow of force through the clutch disk 6). In reverse gears R and R+, the gears 16, $16_1$, $16_2$, $22_1$, $22_2$, $23_1$, $23_2$ and 23 in the main multiple speed transmission 11 share in the transmission of force.

The inventional transmission may be actuated either manually or semiautomatically or fully automatically.

Figure 4:
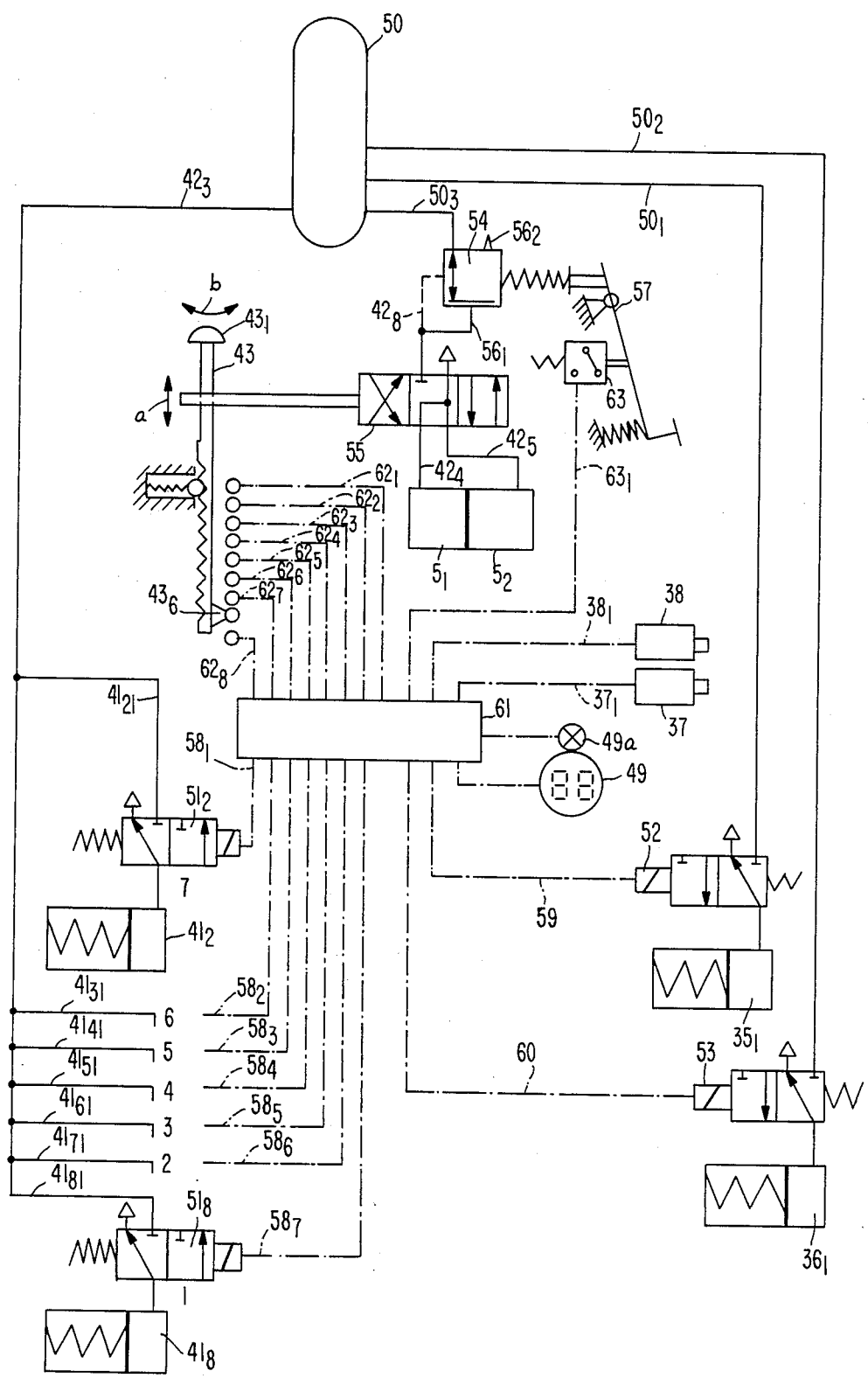
FIG. 4 shows the control diagram of the transmission featuring manual operation and electronic synchronization.

In the manual transmission actuation according to the diagram in FIG. 4, a clutch pedal 57 is used for starting and shifting along with a manual operating device 43, $43_1$. The manually shifted transmission involves a greater expense than the semiautomatic and fully automatic solutions. However, its use offers presently the advantage that it continues to permit operation in the event of a defective or completely failing electronic system, and that the split group can be shifted without operating the clutch pedal.

Figure 5:
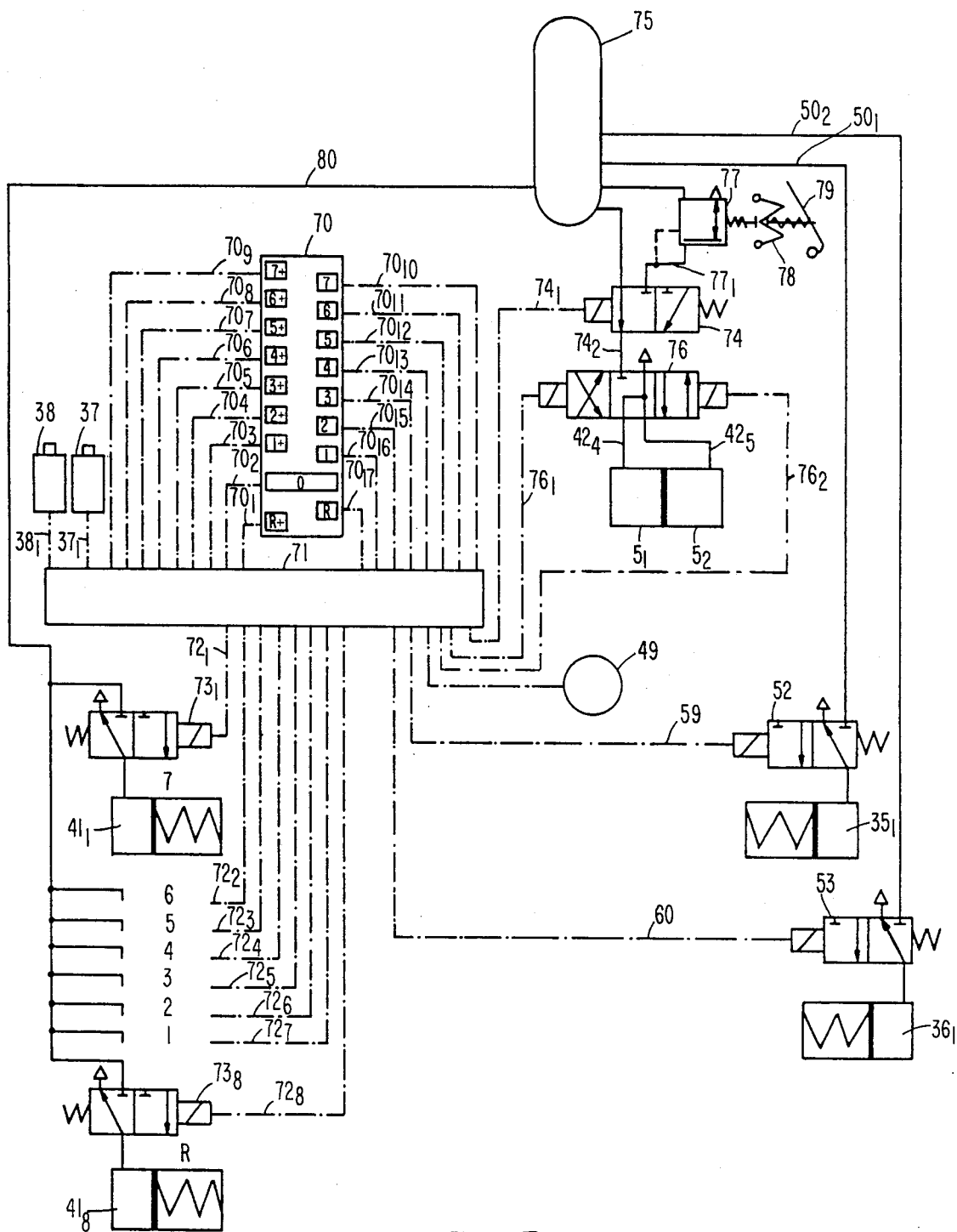
FIGS. 5 and 6 show the control diagrams of the semi-automatic and/or fully automatic transmission actuation.

In the semiautomatic actuation of the transmission according to the diagram in FIG. 5, no clutch pedal is needed for starting and shifting. In starting, the engagement operation of the clutch 3 is controlled in response to the engine speed and the accelerator position. The gears are shifted manually by means of electrical switches.

Figure 6:
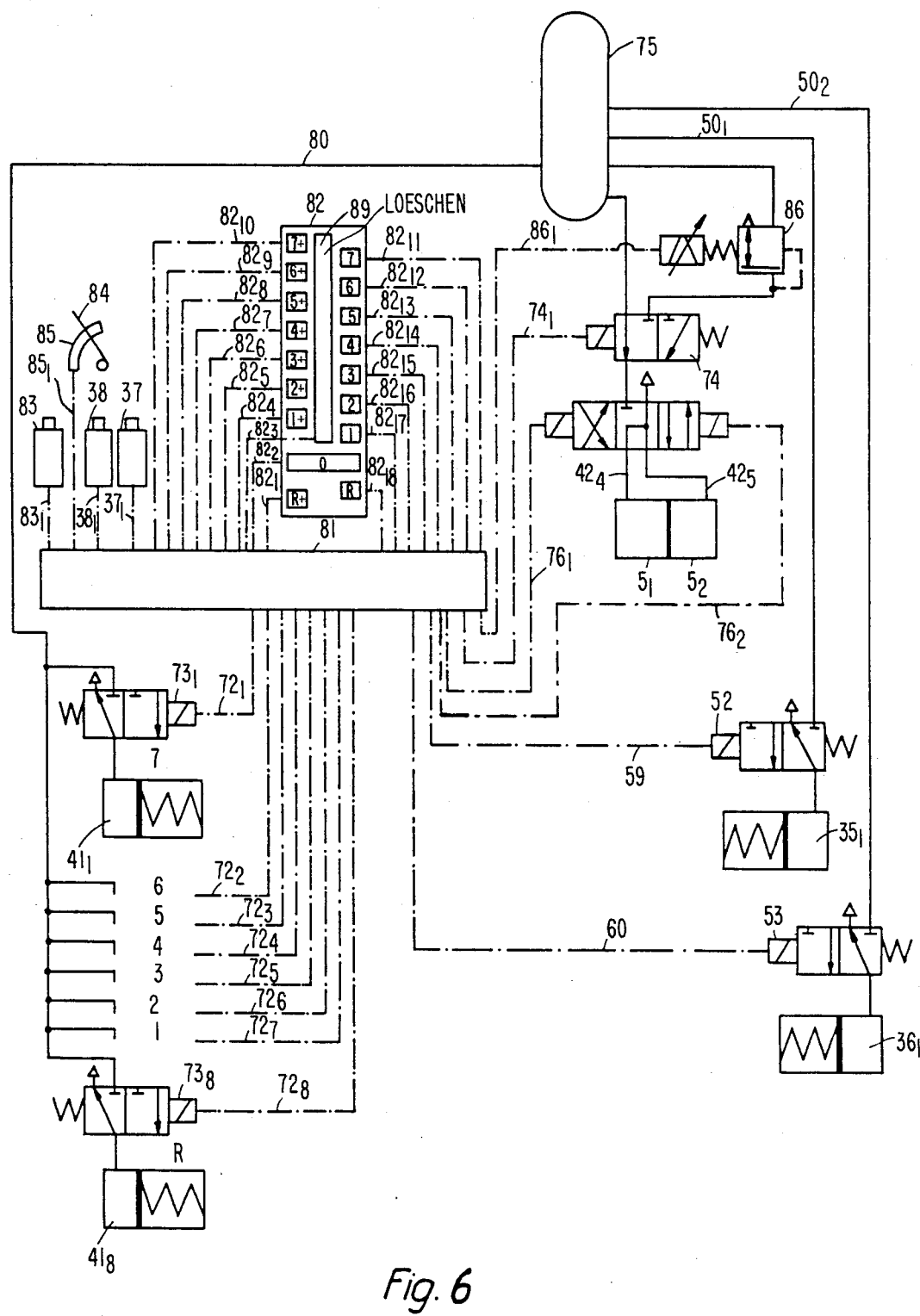

With the fully automatic transmission actuation according to the diagram in FIG. 6, starting and shifting occur as well without a clutch pedal. The electrical control (microprocessor) causes not only the synchronization but initiates also the shifting of the gears with the aid of speed sensors arranged in the transmission input and output.

1. Manual Transmission Actuation

In the diagram relative to FIG. 4, the compressed air tank 50 connects through the line $42_3$, branch lines $41_{21}$ through $41_{81}$, and through electrically actuated 3/2-way valves $51_2$ through $51_8$ with respective pressure spaces $41_2$ through $41_8$ of the selector fork operating pistons. Only the 3/2-way valves $51_2$ and $51_8$ and the pressure spaces $41_2$ and $41_8$ of the operating pistons for speeds 7 and 1 are indicated in FIG. 4, while these elements are only symbolized by the respective numeral for speeds 2 through 6. (For the reverse gear they have been omitted). The valves $51_2$ and $51_8$ are presented in their inoperative position (solenoid not excited). Each of these valves connects in this position its pressure space $41_2$, $41_8$ with the vent, so that the respective gears are disengaged. When exciting one of the solenoids (for instance $51_8$), the respective gear is engaged. The valves $51_1$ through $51_8$ are preferably arranged directly on the cylinder housing 39 (FIG. 2).

Also, the tank 50 connects through the line $50_1$ and the electrically switched 3/2-way valve 52 with the pressure space $35_1$ of the brake 35 of the accelerating device 33. Another line $50_2$ runs from the tank viat the 3/2-way valve 53 to the pressure space $36_1$ of the disk brake 36 retarding the auxiliary shaft $24_1$.

For operating the double shift clutch 3, the following is provided: A line $50_3$, $56_1$ with pressure control valve 54 runs to the reversing valve 55, which can be mechanically actuated by twisting the shift rod 43 (double arrow b). Depending on the position of the valve 55, compressed air proceeds from the tank through the lines $42_4$ and/or $42_5$ to the respective operating annular space of the double acting pneumatic cylinders $5_1$, $5_2$ for acting upon the respective clutch disk 6 or 7. In starting, the compressed air pressure can be regulated with the aid of the clutch pedal 57 and the pressure control valve 54 (control line $42_8$). As long as the clutch pedal is depressed, compressed air proceeds uncontrolled to the clutch 3. The 3/2-way valves 51 connect though electrical lines $58_1$ through $58_7$, the 3/2-way valves 52 and 53 through electrical lines 59 and 60 with the electrical control (microprocessor 61). The microprocessor receives input signals through the line $38_1$ from the sensor 38, and through the line $37_1$ from the sensor 37. Both continually pick up the rotational speed of the output and/or input train. In addition, information concerning the desired speed (likewise also concerning the shift direction) are conveyed to the microprocessor. This takes place through the lines $62_1$ through $62_7$ for the forward speeds 7 through 1, and through the line $62_8$ for the reverse gear R. By axial shifting (a) of the shift rod (43), which may assume nine positions, each of these lines can be connected alternately with the slip contact $43_6$. Shown in the drawing is only the gearshift rod 43 in idling position (between gears 1 and R). Moreover, the microprocessor receives the information—through the electrical switch 63 operated by the clutch pedal 57 and the line $63_1$—whether the connection between engine and transmission has been interrupted or established.

The shift operation in the multiple speed transmission 11 is initiated by the driver through operation of the clutch pedal 57 and shifting the gearshift rod 43 in the position of the desired speed. As the clutch pedal is depressed, the unregulated compressed air flow to the momentarily supplied pressure space of the pneumatic cylinder $5_1$, $5_2$ is interrupted. Depending on the position of the 4/3-way valve 55, the pressurized annular cylinder space of the annular cylinder $5_1$, $5_2$ is depressurized through the vent $56_2$ of the pressure control valve 54. This interrupts the flow of force between engine and transmission, irrespective of whether or not a regular speed or a split speed is engaged. Controlling the electronic synchronization, the microprocessor 61 is informed of the flow of force interruption, through the switch 63 which is closed when the clutch pedal is depressed. As the driver now moves the gearshift rod 43 in axial direction, with the aid of the handle $43_1$, he informs the microprocessor 61 through one of the lines $62_1$ through $62_8$ which of the gears is to be engaged, with the microprocessor first deactivating the previously excited solenoid (one of $51_2$ through $51_8$). This causes the venting of the respective pressure space (one of $41_2$ through $41_8$) of the selector fork operating piston of the previously engaged gear. Thus, the sliding sleeve disengages from the entraining teeth of the selected gear, through the return compression spring acting on the operating piston and the selector fork.

During the axial movement (a) of the gearshift rod 43, the driver is informed of the momentary position, through a digital display 49 controlled by the processor 61, and thus the speed selected by him as the respective numeral appears on the display. A warning signal (for instance an indicator light 49a) informs the driver during the shift operation that the synchronization of the selected speed is not completed yet.

In order to avoid unnecessarily long synchronization times in shifting down and aid the driver in selecting the lower speed, the microprocessor can cause the blinking, on another digital display, of the number of the lowest possible gear in which the input end of the transmission will not overspeed or the vehicle must be slowed down using the operating brake. The microprocessor can determine this value from the engaged speed, the continually sensed speed of rotation of the output train and the fixed gear ratios.

Once the driver has moved the gearshift rod 43 is the intended position (and, as the case may be, the numerals of the two illuminated displays are in agreement), the command input to the microprocessor 61 is completed and the synchronization can take place. The microprocessor monitors the rotational speeds of the input and the output trains and, depending on shifting direction (up or down), actuates the solenoid 52 or 53. This causes either a connection of the pressure space $35_1$ of the brake 35 or of the pressure space $36_1$ of the brake 36 with the compressed air tank and the acceleration or retardation of the auxiliary shaft $24_1$, and thus of the gears to be shifted. Once synchronism has been established between the respective gear on the output shaft and the sliding sleeve, the microprocessor 61 deactivates the solenoid valve 52 or 53 by shutting off the current in the lines 59 and/or 60, i.e., the pressure chamber $35_1$ and/or $36_1$ is vented. The microprocessor actuates at the same time the 3/2-way valve $51_1$ through $51_8$ corresponding to the selected speed, by exciting the pertaining solenoid. This opens the compressed air supply to the pressure space $41_1$ through $41_8$ of the respective operating piston of the sliding sleeve, and the sleeve will engage. All of this occurs within the range of tenths of a second. The completion of the synchronizing process is indicated to the driver by extinction of the above warning signal 49a. He can now gradually release the clutch pedal, thereby building up controlled pressure in the respective operating annular space of the annular cylinder $5_1$, $5_2$, through the valve 54, thereby restoring the flow of force between the transmission and the engine. During the normal travel, the digital display 49 informs the driver of the gear which is engaged.

2. Semiautomatic Transmission Actuation

FIG. 5 shows a simplified shifting diagram. The moment of shifting and the speed are determined by the driver by operating the corresponding switches on the panel 70. To convey the shift intention and the intended speed, each switch connects through an electrical line $70_1$ through $70_{17}$ with the microprocessor 71. Information on the speeds of rotation in the input and output trains are transmitted to the microprocessor by the sensors 37 and 38 through lines $37_1$ and $38_1$. The synchronization is controlled again by the microprocessor. It contacts for that purpose through electrical lines $72_1$ through $72_8$ with the solenoid valves $73_1$ through $73_8$ for regulating the pressure admission to the operating pistons of the sliding sleeves, and through lines 59 and 60 with the solenoid valves 52 and 53 which determine the shift condition of the brakes 35 and 36 for retardation and/or acceleration of the transmission shafts $24_1$ and $24_2$. By actuating the reversing valve 74 via the line $74_1$ and the 4/3-way valve 76 through one of the lines $76_1$ and $76_2$, the microprocessor 71 establishes the flow of force connection or interruption between the engine and the transmission, and thus the activation of the planetary gear set 27 for the split gear ratio. The pressure condition in the operating spaces of the double-acting pneumatic cylinder $5_1$, $5_2$ is determined through the solenoid valve 76, which can be switched into three positions. In the center position of the valve, both chambers are unpressurized and, thus, both clutch disks 6 and 7 disengaged, interrupting the flow of force between the engine and the transmission. In the other two valve positions, one chamber is always pressurized and, thus, either the clutch disk 6 or 7 engaged. To accomplish a controlled engaging when starting, the reversing valve 74 establishes the pressure connection from the compressed air tank 75 to the pressure spaces of the pneumatic cylinder $5_1$, $5_2$ through a pressure control valve 77. Acting on the pressure control valve 77 as control variables are the engine speed (symbolically illustrated by the "control" 78) and the position of the accelerator 79.

Described hereafter are three different shift operations:

(2.1) If the flow of force must be interrupted between the engine and the transmission, the driver presses the key "0" on the panel 70. In response, the microprocessor 71 moves the valve 76 to its center position and vents the two chambers of the pneumatic cylinder $5_1$, $5_2$ through the compressed air lines $42_4$ and $42_5$. The microprocessor selects this position of the valve 76 also without command unit by the driver as soon as the sensor 37 reports a specific minimum speed of rotation, so as to prevent a stalling of the engine. Next, the microprocessor 71, by changeover of the valve 74, automatically connects the input line $74_2$ of the 4/3-way valve with the output line $7_1$ of the pressure control valve 77 so that a controlled pressure can be built up in the pneumatic cylinder $5_1$, $5_2$ for the subsequent starting.

(2.2) If the driver instructs to changeover from the regular to the split gear or vise versa, the microprocessor actuates the 4/3-way valve 76 from the one limit position through the center position to the other limit position. This causes the pressure admission of the double-acting pneumatic cylinder to change from the one piston side to the other, and the planetary gear 27 is engaged or disengaged for producing the split ratio.

(2.3) If the driver selects another speed, the microprocessor 71 examines in down shifting, through the sensor 38, whether the intended gear can be shifted without overspeeding the input end. If this is not the case, the digital display 49 starts blinking the number of the lowest possible gear. The driver must then shift this gear anew, and the microprocessor moves the 4/3-way valve through the line $76_1$ in center position, interrupts the flow of force between the engine and the transmission, and then switches, of the solenoid valves $73_1$ through $73_8$, the valve coordinated with the selected gear through its line $72_1$ through $72_8$ in the position where the pressure space $41_1$ through $41_8$ of the selector fork operating piston coordinated with the engaged gear will be vented. This causes the sliding sleeve to disengage the entraining teeth of the selected gear wheel, due to the return compression spring force acting on the operating piston.

The solenoid valves $73_1$ through $73_8$ and the pressure spaces $41_1$ through $41_8$ of the selector fork operating pistons are shown in FIG. 5 for the 7th forward and the reverse gear, and are symbolized for the other speeds by the respective number. Each of the valves $73_1$ through $73_8$ can be switched in two positions. In the inoperative position presented in FIG. 5, which is assumed when the respective speed is not engaged, the valve vents the coordinated pressure space $41_1$ through $41_8$. In the operating position, i.e., with the solenoid excited and the gear engaged, it connects the coordinated pressure space $41_1$ or $41_2$ through $41_8$ through the line 80 with the compressed air tank 75.

Upon disengagement of the sliding sleeve of the previously engaged gear, the microprocessor determines the rotational speeds of the input and output trains by way of sensors 37 and 38 and, depending on shift direction, actuates the solenoid valve 52 or 53. In response, either the pressure space $35_1$ of the brake 35 or the pressure space $36_1$ of the brake 36 is being connected with the compressed air tank 75 and the auxiliary shafts $24_1$ and $24_2$ are accelerated or retarded. Once synchronism has been accomplished between the gear on the main shaft 24 to be shifted and the corresponding sliding sleeve, the microprocessor deenergizes again the solenoid valve 52 or 53, causing the pressure space $35_1$ and/or $36_1$ to be vented. At the same time, the pressure space $41_1$ through $41_8$ coordinated with the newly selected gear is pressurized through the microprocessor by actuation of the respective solenoid $73_1$ through $73_8$, and the sliding sleeve is engaged through the operating piston. Next, the microprocessor switches the 4/3-way valve 76 from the center position to the selected limit position so that, by pressure admission to the respective operating space of the annular cylinder $5_1$, $5_2$, the clutch disk 6 or 7 restores the flow of force between the engine and transmission. The shift operation is completed and the digital display, blinking up to that point, displays now permanently the number of the newly engaged gear.

(2.4) If the driver selects the reverse gear by pressing the key R or R+, the shift operation proceeds as described under (3), but with the exception that the microprocessor, after switching the 4/3-way valve in the center position, will actuate the other valves only as the sensor reports an output speed of zero.

(2.5) In starting, i.e., when raising the engine speed for forward or reverse travel, the microprocessor switches upon driver input of the selected starting gear the 4/3-way valve 76 from its center position in the respective limit position. Up to a specific speed of rotation reported by the sensors 38, the driver leaves the reversing valve 74 in its position where the connected pressure space of the annular cylinder $5_1$, $5_2$ makes connection with the compressed air tank 75 through the pressure control valve 77. This causes a controlled buildup of the clutch pressure based on the position of the accelerator and the engine speed, through the "regulator" 78. From a predetermined speed of rotation onward, the microprocessor switches the reversing valve in its home position, connecting the pressure space of the annular cylinder $5_1$, $5_2$ directly with the compressed air tank 75. If the driver misshifts—for instance when traveling in direct gear and intending to engage gear 6+ and/or 6 but shifting into third gear—the display marked 49 in FIGS. 4 and 5, normally displaying the gear engaged, starts blinking the required gear as determined by the computer from the transmission output speed. This display may be corrected by another accelerator position information conveyed to the computer.

3. Fully Automatic Transmission Actuation

The diagram in FIG. 6 corresponds closely with the diagram of the semiautomatic transmission presented in FIG. 5. Identical elements in FIGS. 5 and 6 are therefore identified using identical reference numbers.

In contrast to the semiautomatic solution, the change of all forward speeds is initiated by the microprocessor 81. For that purpose, the microprocessor senses the engine load through an engine speed sensor through the line 83₁; the position of the accelerator 84 through the contact rail 85 and the line 85₁; and the vehicle speed through the sensor 38 of the output train. The processor compares these values with the programmed shifting points and initiates the respective gearshifting. The shift operation i.e., actuating the valves for synchronization, flow of force interruption between engine and transmission, and operation of the various elements, proceeds the same as in the semiautomatic transmission. In variation from it, only the pressure control valve 86 is as well actuated by the microprocessor through the line 86₁, for controlled pressure buildup in the pressuce chambers of the annular cylinder 5₁, 5₂, in starting. Variables used for that purpose are the engine speed and the accelerator position. The necessary connecting lines between panel 82 and microprocessor 81 are marked 82₁ through 82₁₈ in the diagram. Thus, the panel permits the driver to influence the shifting points programmed in the microprocessor. The panel of the fully automatic transmission features a cancel key 89 for changing the shift program.

The microprocessor 81 causes the gears to be shifted automatically up to the topmost gear, unless a lower speed has been selected on the panel 82. In normal level traffic, forward 7+ will be preselected causing the transmission to shift through the 1+ through 7+ column. If 7 is preselected, the transmission shifts according to this column. If both 7+ and 7 are preselected, the transmission will shift through all gears. When the vehicle is subjected to heavy loads and the driver is of the opinion that he should travel in the additionally geared speed 1 while thereafter he may change over to the 1+ to 7+ column, he will preselect 1 and 7+. As a result, gears 1, 1+ through 7+ will be shifted; if he feels that up to third gear he shoud drive at a finer graduation, he will select 3 and 7+, causing the transmission to shift 1, 1+, 2, 2+, 3, 3+, through 7+. If the driver wants to prevent the transmission from shifting below a specific gear, he must preselect the respective gear in column 1-7. Example: On a hilly stretch with a uniform climb the driver wants to prevent a continuous shifting between 4 and 3+ (with both columns preselected); this shifting can be prevented by preselecting the 4-key.

I claim:

1. A multiple speed transmission for motor vehicles having a plurality of gear ratios, said transmission comprising:
    a main transmission shaft and at least one juxtaposed auxiliary transmission shaft, a plurality of gear wheel groups mounted thereon, each of said gear wheel groups having at least two gears which are in permanent meshing arrangement;
    sliding sleeves for shifting between said gear wheel groups, which sleeves are positioned on one of said transmission shafts, said sleeves are rotationally fixed and axially slidable on said transmission shaft to positively couple with at least one gear;
    a selector fork for each of said sliding sleeves;
    actuating cylinders having actuating pistons therein, each of said pistons operably connected to one of said selector forks and movable by communication of a servoagent to said cylinder to move said selector fork;
    an accelerating device;
    a retardation device;
    said accelerating device and said retardation device acting on one of said auxiliary shafts to synchronize one of said sliding sleeves for engagement with one of said gears;
    an electrical control means for receiving sensed rotational speed signals and shift commands to control communication of said servoagent to said actuating cylinders and pistons in response to synchronism of the respective sliding sleeve;
    dual frictional shifting elements;
    an auxiliary transmission component which is operable by said dual frictional shifting elements to provide a split speed arrangement which doubles the number of gear ratios of said transmission; and,
    said accelerating device having a planetary gear set for a necessary speed jump and a friction brake, said planetary gear set adapted to connect said main transmission shaft to said one of said auxiliary shafts.

2. A mutliple speed transmission for motor vehicles as claimed in claim 1 wherein said sliding sleeves are mounted and slidable on said main shaft.

3. A multiple speed transmission for motor vehicles as claimed in claim 2 wherein said accelerating device and said retarding device are frictional shifting elements operable between engaged and disengaged positions.

4. A multiple speed transmission for motor vehicles as claimed in claim 3 wherein said auxiliary transmission component precedes said transmission shafts; said dual frictional shifting elements incldue a double shift clutch operable to change gears in said auxiliary transmission component; said transmission having a housing with a dry space; and, said double shift clutch preferably mounted in said dry space and operable as a starting clutch.

5. A multiple speed transmission for motor vehicles as claimed in claim 2 wherein said transmission has a first auxiliary shaft and a second auxiliary shaft, which main shaft, first auxiliary shaft and second auxiliary shaft are coplanar.

6. A multiple speed transmission for motor vehicles as claimed in claim 5 wherein said accelerating device and said retarding device are frictional shifting elements operable between engaged and disengaged positions.

7. A mutliple speed transmission for motor vehicles as claimed in claim 6 wherein said auxiliary transmission component precedes said transmission shafts; said dual frictional shifting elements include a double shift clutch operable to change gears in said auxiliary transmission component; said transmission having a housing with a dry space; and, said double shift clutch preferably mounted in said dry space and operable as a starting clutch.

8. A multiple speed transmission for motor vehicles as claimed in claim 5 wherein said auxiliary transmission component precedes said transmission shafts; said dual frictional shifting elements include a double shift clutch operable to change gears in said auxiliary transmission component; said transmission having a housing with a dry space; and, said double shift clutch preferably mounted in said dry space and operable as a starting clutch.

9. A multiple speed transmission for motor vehicles as claimed in claim 1 wherein said auxiliary transmission component is a planetary gear set.

10. A multiple speed transmission for motor vehicles as claimed in claim 9 wherein said accelerating device and said retarding device are frictional shifting elements operable between engaged and disengaged positions.

11. A multiple speed transmission as claimed in claim 10 wherein a double shift clutch has a first clutch disk and a second clutch disk; said auxiliary transmission component having a pilot shift gear; a hollow shaft drivingly coupled between said second clutch disk and said pilot shift gear; a drive shaft drivingly coupled between said first clutch disk and said main transmission shaft of the multiple speed transmission;

a clutch housing for said first clutch disk and said second clutch disk; an axially shiftable housing center ring in said clutch housing, which center ring is operable as a countersurface for said first clutch disk and said second clutch disk.

12. A multiple speed transmission for motor vehicles as claimed in claim 10 wherein said auxiliary transmission component precedes said transmission shafts; said dual frictional shifting elements include a double shift clutch operable to change gears in said auxiliary transmission component; said transmission having a housing with a dry space; and, said double shift clutch preferably mounted in said dry space and operable as a starting clutch.

13. A multiple speed transmission as claimed in claim 12 wherein said double shift clutch has a first clutch disk and a second clutch disk; said auxiliary transmission component having a pilot shift gear; a hollow shaft drivingly coupled between said second clutch disk and said pilot shift gear; a drive shaft drivingly coupled between said first clutch disk and said main transmission shaft of the multiple speed transmission; a clutch housing for said first clutch disk and said second clutch disk; an axially shiftable housing center ring in said clutch housing which center ring is operable as a countersurface for said first clutch disk and said second clutch disk.

14. A multiple speed transmission as claimed in claim 9 wherein a double shift clutch has a first clutch disk and a second clutch disk; said auxiliary transmission component having a pilot shift gear; a hollow shaft drivingly coupled between said second clutch disk and said pilot shift gear; a drive shaft drivingly coupled between said first clutch disk and said main transmission shaft of the multiple speed transmission; a clutch housing for said first clutch disk and said second clutch disk; an axially shiftable housing center ring in said clutch housing, which center ring is operable as a countersurface for said first clutch disk and said second clutch disk.

15. A multiple speed transmission for motor vehicles as claimed in claim 1 wherein said transmission has an input train and an output train, and further comprises a first rotational speed sensor arranged at the input train and a second rotational speed sensor arranged at the output train; said sensors coupled to and operable to provide speed signals to said electrical control means.

16. A multiple speed transmission for motor vehicles as claimed in claim 1 wherein said accelerating device and said retarding device are frictional shifting elements operable between engaged and disengaged positions.

17. A multiple speed transmission for motor vehicles as claimed in claim 16 wherein said auxiliary transmission component precedes said transmission shafts; said dual frictional shifting elements include a double shift clutch operable to change gears in said auxiliary transmission component; said transmission having a housing with a dry space; and, said double shift clutch preferably mounted in said dry space and operable as a starting clutch.

18. A multiple speed transmission for motor vehicles as claimed in claim 1 wherein said auxiliary transmission component precedes said transmission shafts; said dual frictional double shifting elements include a double shift clutch operable to change gears in said auxiliary transmission component; said transmission having a housing with a dry space; and, said double shift clutch preferably mounted in said dry space and operable as a starting clutch.

19. A multiple speed transmission as claimed in claim 1 wherein said transmission is a manually actuated transmission having one of a shift lever and shift knob which is operable in a first direction to change gear speed ratios in said transmission and which shift lever is operable in a second direction perpendicular to said first direction to change gear speed ratios in said split speed arrangement.

* * * * *

UNITED STATES PATENT AND TRADEMARK OFFICE
CERTIFICATE OF CORRECTION

PATENT NO. : 4,727,764

DATED : March 1, 1988

INVENTOR(S) : Hermann Klaue

It is certified that error appears in the above-identified patent and that said Letters Patent is hereby corrected as shown below:

```
Col. 2, line 51, change "thesprings" to --the springs--;
Col. 3, line 22, insert --uniform-- after "maximally";
Col. 4, line 61, change "viat" to --via--;

Col. 6, line 9, change "is" to --in--;
Col. 7, line 24, change "unit" to --input--;
Col. 7, line 29, change "7," to --77,--;
Col. 9, line 13, change "pressuce" to --pressure--;
Claim 4, Col. 10, line 29, change "incldue" to --include--.
```

Signed and Sealed this

Twenty-third Day of August, 1988

Attest:

DONALD J. QUIGG

*Attesting Officer*      *Commissioner of Patents and Trademarks*